United States Patent [19]
Cimperman

[11] Patent Number: 4,831,924
[45] Date of Patent: May 23, 1989

[54] APPARATUS FOR ALIGNING ARTICLES

[75] Inventor: Fred J. Cimperman, Castro Valley, Calif.

[73] Assignee: Ashlock Company, a Division of Vistan Corporation, San Leandro, Calif.

[21] Appl. No.: 184,277

[22] Filed: Apr. 21, 1988

[51] Int. Cl.⁴ .......................... A23N 3/00; A23N 4/08
[52] U.S. Cl. ........................................ 99/538; 99/549; 198/384
[58] Field of Search ................. 99/537, 538, 549, 550, 99/547, 548, 552, 494; 198/384, 397; 83/425, 425.2, 436

[56] References Cited

U.S. PATENT DOCUMENTS

| | | |
|---|---|---|
| 2,212,892 | 8/1940 | Ashlock . |
| 2,635,662 | 4/1953 | Doering et al. .......................... 99/550 |
| 3,272,311 | 9/1966 | Blakewell et al. . |
| 3,434,583 | 3/1969 | Belk . |
| 3,605,984 | 9/1971 | Erekson et al. . |
| 3,796,146 | 3/1974 | Lacey ................................ 99/550 X |
| 4,202,261 | 5/1980 | Lawson ............................ 198/384 X |
| 4,231,462 | 11/1980 | Ackley, Sr. et al. . |
| 4,266,477 | 5/1981 | Ackley . |
| 4,388,858 | 6/1983 | Margaroli et al. . |
| 4,646,632 | 3/1987 | Rubio ..................... 99/538 |
| 4,682,683 | 7/1987 | Ackley, Sr. et al. ............ 198/384 X |
| 4,730,554 | 3/1988 | Kristiaan ........................... 99/549 X |
| 4,741,428 | 5/1988 | Taniguchi et al. ................... 198/397 |
| 4,777,872 | 10/1988 | Rubio ..................... 99/538 |

Primary Examiner—Timothy F. Simone
Attorney, Agent, or Firm—Alfred A. Equitz

[57] ABSTRACT

A method and apparatus for aligning articles as the articles are translated in cups along a substantially circular path. In one embodiment, each cup is formed in the outer surface of a rotating cylindrical drum, and one or more slots, each oriented parallel to the substantially circular path, extend through each cup's bottom surface. A stationary, notch alignment strip is positioned in at least one of the slots. As the cups translate past the notched strip, the strip bumps the articles in the cups to urge them into a uniform alignment. In a preferred embodiment, the slots are spaced and dimensioned to receive parallel slicing knives. In an important application of the invention, the cups are dimensioned to carry pitted olives, and the slots are spaced and dimensioned to receive a set of parallel olive slicing knives.

29 Claims, 2 Drawing Sheets

APPARATUS FOR ALIGNING ARTICLES

FIELD OF THE INVENTION

The invention relates to methods and apparatus for aligning articles for subsequent processing. More particularly, the invention is a method and apparatus for aligning articles, such as olives, for subsequent processing, while the articles translate along a circular path in cups.

BACKGROUND OF THE INVENTION

Conventional olive slicing machines employ rotating knives to slice olives positioned in pockets on a drum. In such machines, the olive-containing pockets are translated past a set of parallel knives as the drum rotates about a shaft. Each olive is preferably aligned with its longitudinal axis perpendicular to the knife edges during the slicing operation.

To slice olives or other fruit (or more generally, any articles) using a conventional slicing machine, the articles to be sliced must be loaded onto the machine. Unfortunately, in order to load the articles efficiently, their orientations are typically randomized. Thus, the articles are either sliced with random orientation or must be aligned prior to slicing.

Techniques have been developed for orienting generally spherical articles (such as fruit) having indentations (such as the indented area surrounding a fruit stem) and which are positioned in cups, while the cups are translated to a processing station. For example, a stationary, elongated rod has been positioned in the path of one or more translating cups, each containing a piece of fruit to be sliced. In a conventional system including such a rod, the rod is positioned just above the bottom of the cups so that the rod bumps the fruit as the cups translate past the rod until the fruit rotates into a desired orientation. In such desired orientation, the indented area of the fruit aligns with the rod. In the desired orientation, the fruit preferably rests on the cup bottom and the rod exerts no force on the fruit, so that the fruit will remain in the desired orientation for subsequent processing.

It has not been known until the present invention how to align elongated, generally rotationally symmetric articles (for example, olives and some other fruit), which may or may not have an indented surface region, in an accurate and convenient manner. In particular, it has not been known how to align (or orient) olives, both accurately and conveniently, for subsequent slicing by knives.

SUMMARY OF THE INVENTION

The invention is a method and apparatus for aligning articles in cups, as the cups are translated along a substantially circular path. In one embodiment, each cup is formed in the outer surface of a rotating cylindrical drum, and one or more slots (oriented substantially parallel to the substantially circular path) extend through the bottom surface of each cup. A stationary, notched alignment strip is positioned in at least one slot. As the cups translate past the notched strip, the strip bumps the articles in the cups to urge them into a desired uniform alignment.

In a preferred embodiment, the slots are dimensioned to receive parallel slicing knives after the knives have passed through an article held in the cup. In an important application of the invention, the cups are spaced and dimensioned to carry pitted olives, and the slots are spaced and dimensioned to receive a set of parallel olive slicing knives.

DETAILED DESCRIPTION OF THE PREFERRED EMBODIMENTS

Figure 3:
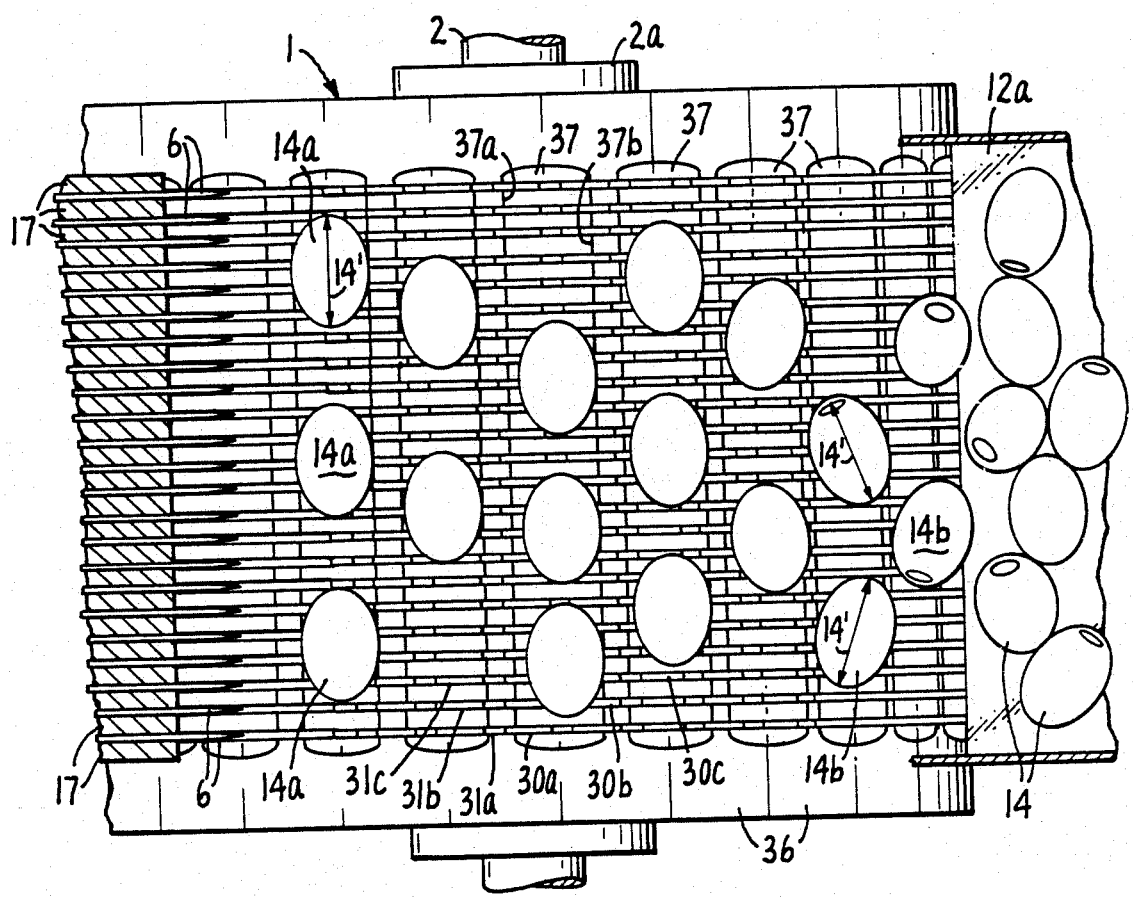
FIG. 3 is a cross-sectional view of the apparatus shown in FIG. 1, in the horizontal plane defined by line 3—3 in FIG. 1.

The overall arrangement of a preferred embodiment of the inventive apparatus will be described with reference to FIG. 1. Chucks 4 are fixedly attached to the outer cylindrical surface of rotating cylindrical drum. Drum 1 is fixedly attached to drum hub 2a, which in turn is fixedly attached to rotatable shaft 2. Shaft 2 is journaled in bearings (not shown) which are mounted on the external frame which supports the entire apparatus. Outer portions 36 of chucks 4 define pockets 37 (alternatively referred to herein as "cups" 37). Cups 37 are preferably elongated, with the longitudinal axis of each cup oriented parallel to the axis of shaft 2 (as shown in FIG. 3), to be discussed below). As drum 1 rotates, outer portions 36 of chucks 4 translate pitted olives 14, each olive being carried in one of cups 37, along a counter-clockwise circular path into engagement with set of slicing knives 6. Olives 14 are severed into slices 40 by knives 6. Slices 40 are collected in product bin 38 as they fall from knives 6.

Although the apparatus of FIGS. 1-4 may be dimensioned for processing olives, it is specifically contemplated that various embodiments of the inventive apparatus may be employed for processing articles other than olives. Most broadly defined, the invention is suitable for processing any kind of elongated, generally rotationally symmetric article (which article may or may not have an indented surface region). However, for specificity, the inventive system will be described throughout the Specification as suitable for processing olives.

In a preferred embodiment, drive chain 24 is connected between shaft 8 and drive means 26, and drive chain 20 is connected between shaft 2 and drive means 22. Drive means 22 rotates chain 20, and hence shaft 2, drum hub 2a, drum 1, and chucks 4, in a counter-clockwise direction. Knives 6 are fixedly attached to knife hub 7, and hub 7 is fixedly attached to rotatable shaft 8. Drive means 26 rotates chain 24, and hence hub 7 and knives 6, in a clockwise direction. In an alternative embodiment, knives 6 do not rotate. Instead, knives 6 are held stationary while olives 14 are translated counter-clockwise into engagement therewith.

Thus, when drive means 22 rotates drum 1, cups 37 are translated along a circular path in a plane perpendicular to the longitudinal axis of shaft 2. It is contemplated that the inventive apparatus may include any number of cups 37.

A loading means is provided for loading olives 14 into cups 37. For example, such a loading means may comprise loading bin 12 having an inclined surface 12a positioned relative to drum 1 so that olives piled on surface 12a will fall with random orientation into cups 37 as the cups translate past the lower end of inclined surface 12a.

Brush 16 is provided for the purpose of removing excess olives from cups 37 so that there is a single olive (or row of olives) in each cup. Brush 16 is mounted on rotating shaft 18. Drive chain 19 is connected between shaft 18 and shaft 2. As shaft 2 rotates in a counter-clockwise direction, chain 19 will cause shaft 18 and brush 16 to rotate in a counter-clockwise direction. The bristles of brush 16 will tend to brush excess olives back into feed bin 12 so that there is a single olive (or row of olives) in each of cups 37.

Stripper plates 17 are mounted on rods 17a adjacent knives 6, for stripping away olive slices clinging to knives 6. It is contemplated that set of knives 6 may include any number of knives with their edges oriented generally parallelly. Plates 17 are mounted so that a different one of knives 6 is positioned between each pair of adjacent plates 17. Each plate 17 is mounted loosely on fixed rods 17a so that it "floats" relative to knives 6 (i.e. each plate 17 has limited freedom to translate relative to knives 6). As each knife passes between the associated pair of plates 17, the plates 17 will strip away any olive slices clinging to the knife.

Nozzle 10 emits a jet of water or high pressure air (or the like) for cleansing particles from knives 6. Similarly, nozzle 28 emits a jet of water or high pressure air (or the like) for cleansing particles (such as olive fragments) from cups 37.

Figure 2:
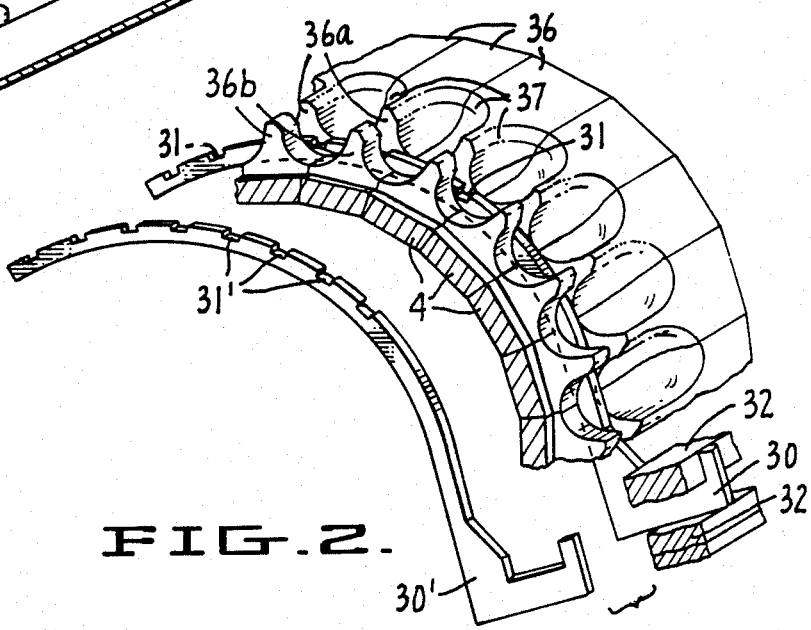
FIG. 2 is a perspective view of a portion of the apparatus shown in FIG. 1.

One or more grooves or slots are formed in chuck portions 36 so that each slot extends through the bottom of several cups 37. As will be described below with reference to FIG. 3, many parallel slots may extend through each cup. Each slot may receive a different alignment strip 30. FIG. 2 shows one such slot, which slot is defined by surfaces 36a of chuck portions 36 and portions 36b of chuck portions 36. Each slot is preferably dimensioned and oriented to receive one of knives 6, so that after each knife 6 slices through an olive, the associated slot will provide clearance for the edge of such knife to avoid engaging outer portion 36 of chucks 4.

At least one curved, notched alignment strip 30 is fixedly mounted adjacent drum 1 so that strip 30 extends through one of the slots. Strip 30 is fixedly attached to stationary frame member 32, for example by screws 34. As drum 1 rotates, cups 37 will translate along a circular path relative to each stationary strip 30.

The edge of strip 30, which includes notches 31, is positioned so as to protrude beyond the surface of chuck portion 36 into the bottom of each cup through which the strip's slot extends. As olives 14 in cups 37 roll over strip 30, each olive will be bumped by notches 31 into alignment with the trailing surface of its cup. Thus, due to each olive's generally rotationally symmetric shape, the olives will roll over notched strip 30, and due to each olive's elongated shape, the most stable position for the olives as they rebound from collisions with the notched portions of strip 30 will be against the trailing edge of their cups with each olive's longitudinal axis perpendicular to the plane of the olives' circular path.

Figure 1:
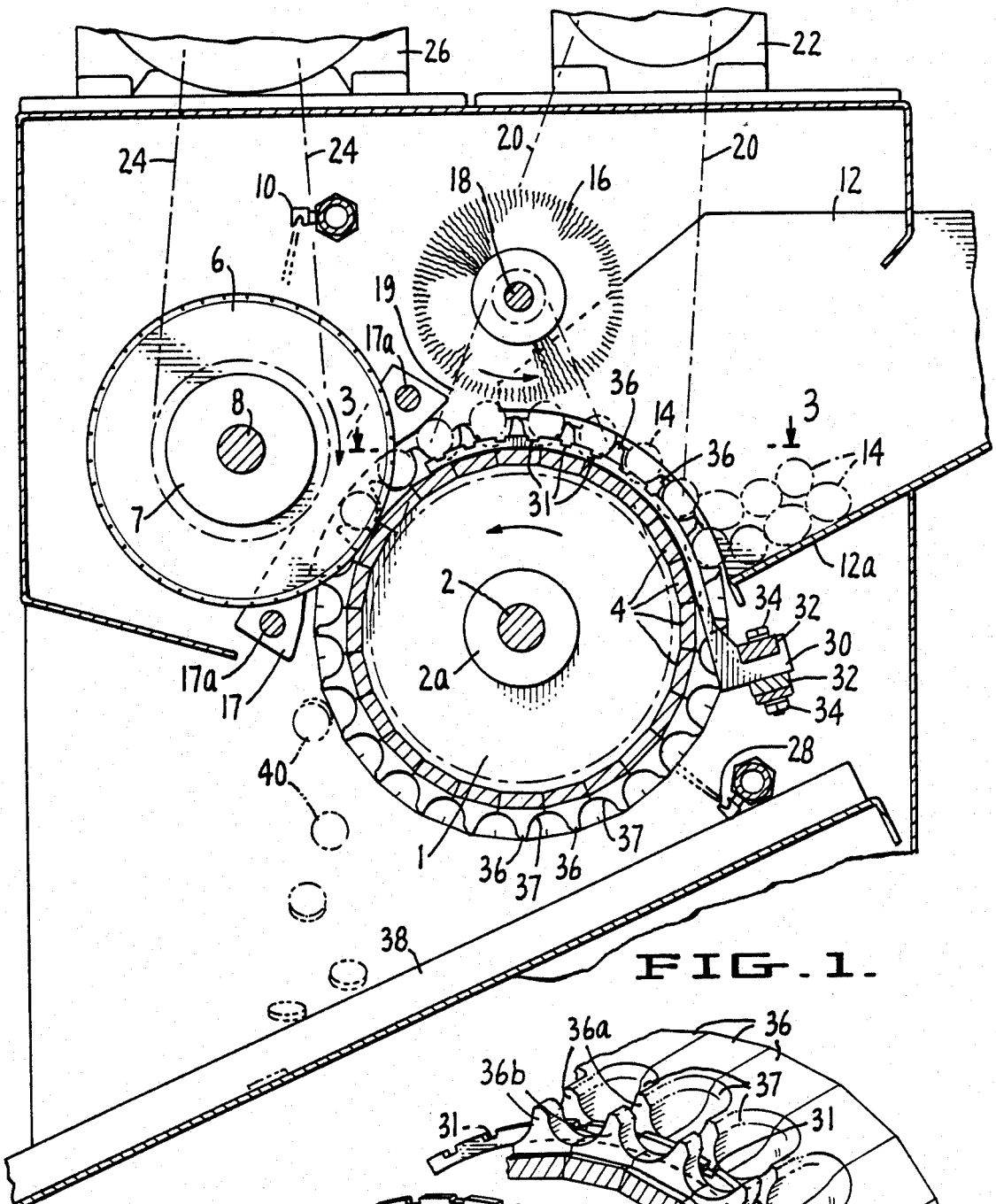
FIG. 1 is a side cross-sectional view of an apparatus embodying a preferred embodiment of the invention.

FIG. 2 is a perspective view of a portion of the FIG. 1 apparatus. A first notched alignment strip 30 extends through a first slot between surfaces 36a and portions 36b of chuck portions 36. A second, identical, notched alignment strip 30' extends through a second slot (not shown) parallel to the first slot. Strip 30 is fixedly attached to frame member 32. Similarly, strip 30' should be fixedly attached to frame member 32 (although the intersection of strip 30' and member 32 is not shown for clarity). Strip 30 includes notches 31, and strip 30' includes notches 31'.

FIG. 3 is a cross-sectional view of the FIG. 1 apparatus in the horizontal plane defined by line 3—3 in FIG. 1. Twenty-three parallel knives 6 are mounted so that their blades extend beyond stripper plate 17. Each knife extends in the space between a different pair of stripper plates 17. Since cups 37 will translate toward the left in FIG. 3 as drum 1 rotates about shaft 2, each cup 37 has a leading edge 37a and a trailing edge 37b. Twenty-three slots extend through each cup 37, each for receiving one of the knives. An alignment strip 30 is positioned within each of the twenty-three slots. For example, strips 30a, 30b, and 30c occupy the three slots nearest the bottom of FIG. 3. Each strip includes eight notches (such as notch 31a in strip 30a, notch 31b in strip 30b, and notch 31c in strip 30c). The notches are aligned, so that for example, notches 31a, 31b, and 31c are centered about a common axis that is parallel to the axis of shaft 2.

Olives 14 fall with random orientation from member 12a into pockets 37 in outer portion 36 of drum 1. As pockets 37 translate to the left in FIG. 3 (as drum 1 rotates counter-clockwise about shaft 2), strips 30 remain stationary. As the olives repeatedly bump against the notched portions 31 of strips 30, they tend to become more uniformly aligned against the trailing edges 37b of the cups with their longitudinal axes 14' parallel with the axis of shaft 2. Thus, olives 14a are more uniformly aligned than are olives 14b.

Figure 4:
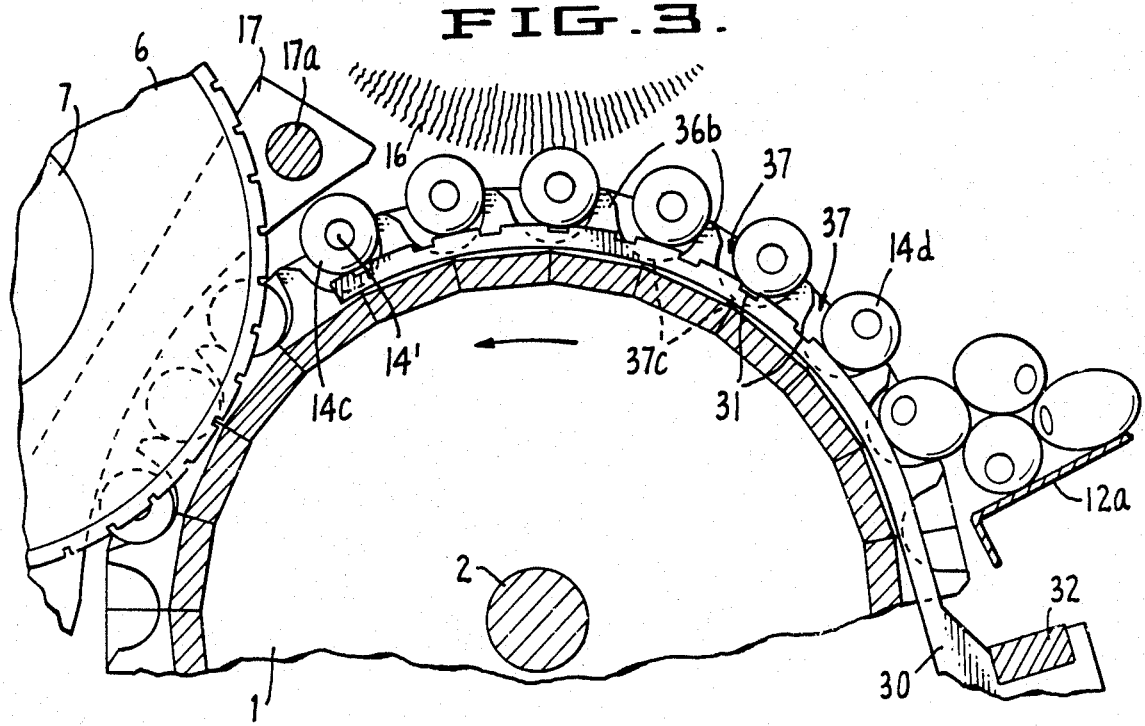
FIG. 4 is an enlarged, side cross-sectional view of a portion of the apparatus shown in FIG. 1.

FIG. 4 is an enlarged, side cross-sectional view of a portion of the FIG. 1 apparatus. Chuck portions 36b separate and define pockets 37. Alignment strip 30 has an upper notched edge protruding above the bottom surface 37c of each cup 37. There are eight notches 31 in strip 30. When olives (such as olive 14d) first enter the pockets, they will have random orientation. By the time the olives (such as olive 14c) have bumped against all eight of the notches, each olive will likely be oriented against the trailing edge of its cup with its longitudinal axis 14' extending perpendicularly to the plane of FIG. 4 (i.e., parallel to the axis of shaft 2). Thus, the olives nearest knives 6 will be optimally aligned for slicing by the knives.

The method of the invention includes the steps of: translating a set of cups along a substantially circular path; and holding an alignment strip, having a notched portion, along the path in a fixed position so that the strip remains stationary as the cups translate along the path, and so that the strip will bump any articles carried within the cups into a uniform alignment. Any of the embodiments of the inventive apparatus described herein with reference to the drawings, and any of numerous variations on such embodiments, may be employed to perform the inventive method. For example, more than one notched alignment strip may be held in a fixed position along the cup path to bump any articles in the cups into a uniform alignment. The cups will preferably include one or more slots, oriented parallel to the cup path. Preferably, a notched alignment strip is held fixedly within each slot, in a manner so that each strip remains stationary as the slotted cups translate past along the path. In such preferred embodiment, each strip has a notched portion with an upper edge which protrudes above a bottom surface of each cup and defines a set of notches. Where more than one slot extends through each cup, and a notched strip is held within each slot, each pair of such strips defines a first set of notches and a second set of notches. Each notch in each such first set is preferably aligned with a corresponding one of the notches in each such second set along a line perpendicular to the path.

The foregoing is merely illustrative and explanatory of the invention. Various changes in the component sizes and shapes, and other details of the embodiments described herein may be within the scope of the appended claims.

What is claimed is:

1. An article alignment apparatus, including:
   (a) a set of cups positioned along a substantially circular path, wherein each said cup has a bottom surface and wherein a first slot extends through the bottom surface of each said cup;
   (b) means for translating the cups along the path; and
   (c) a first alignment strip having a notched portion fixedly positioned in the first slot so that the notched portion remains stationary within the first slot as the cups translate along the path past said first strip.

2. The apparatus of claim 1, also including:
   (d) a rotatable drum, having a substantially cylindrical outer surface; and
   (e) a number of chucks mounted on the outer surface of the drum, each said chuck having an outer surface defining one of the cups.

3. The apparatus of claim 1, wherein a second slot extends through the bottom surface of each said cup, and also including:
   (f) a second alignment strip having a notched portion fixedly positioned in the second slot so that the notched portion remains stationary within the second slot as the cups translate along the path.

4. The apparatus of claim 3, wherein the notched portion of the first strip has a first upper edge which protrudes above the bottom surface of each cup and defines a first set of notches, and the notched portion of the second strip has a second upper edge which protrudes above the bottom surface of each cup and defines a second set of notches.

5. The apparatus of claim 4, wherein each notch in the first set is aligned with a corresponding one of the notches in the second set along a line perpendicular to the path.

6. The apparatus of claim 4, wherein each cup is dimensioned to carry an article having a longitudinal axis, and wherein each notch in the first and second sets is shaped so as to bump any such articles in the cups translating past said each notch in a manner tending to align such articles with their longitudinal axes perpendicular to the path.

7. The apparatus of claim 1, wherein each cup is dimensioned to carry an olive as said each cup translates along the path.

8. The apparatus of claim 7, wherein a plurality of slots extend through the bottom surface of each cup, and including:
   a plurality of alignment strips, each having a notched portion fixedly positioned in a different one of the slots so as to remain stationary as the cups translate along the path past said notched portion.

9. The apparatus of claim 1, also including:
   (g) a first slicing knife mounted along the path in alignment with the first slot, in a position so as to be capable of slicing an article in each cup as each cup translates past the first slicing knife.

10. The apparatus of claim 9, wherein a second slot extends through the bottom surface of each said cup, and also including:
    (h) a second alignment strip having a notched portion fixedly positioned in the second slot so that the notched portion remains stationary as the cups translate along the path; and
    (i) a second slicing knife mounted along the path in alignment with the second slot, in a position so as to be capable of slicing an article in each cup as each cup translates past the second slicing knife.

11. The apparatus of claim 10, wherein the first slicing knife is oriented substantially parallel to the second slicing knife.

12. The apparatus of claim 10, wherein each cup is dimensioned to carry an olive as said each cup translates along the path.

13. The apparatus of claim 1, wherein the notched portion of the first strip has a first upper edge which protrudes above the bottom surface of each cup and defines a set of notches, wherein each cup is dimensioned to carry an article having a longitudinal axis, and wherein each notch in the set of notches is shaped so as to bump any such articles in the cups translating past said set of notches in a manner tending to align such articles with their longitudinal axes perpendicular to the path.

14. An article alignment apparatus, including:
    (a) a rotatable drum, having a substantially cylindrical outer surface;
    (b) a number of chucks mounted on the outer surface of the drum, each said chuck having an outer surface defining a cup, wherein the cups are aligned along a substantially circular path, each said cup has a bottom surface, and wherein a first slot extends through the bottom surface of each said cup;
    (c) means positioned adjacent the drum for loading articles into the cups;
    (d) means for translating the cups along the path; and
    (e) a first alignment strip having a notched portion fixedly positioned in the first slot so that the notched portion remains stationary as the cups translate along the path past the first strip.

15. The apparatus of claim 14, wherein the notched portion of the first strip has a first curved upper edge which protrudes above the bottom surface of each cup and defines a first set of notches, wherein each cup is dimensioned to carry an elongated article having a longitudinal axis, and wherein each notch in the first set of notches is shaped so as to bump any such elongated articles in the cups translating past said first set of notches in a manner tending to align such elongated articles with their longitudinal axes perpendicular to the path.

16. The apparatus of claim 14, wherein each cup is dimensioned to receive an olive.

17. The apparatus of claim 16, also including:
    (g) a first slicing knife mounted along the path in alignment with the first slot, in a position so as to be capable of slicing an article in each cup as the cup translates past the first slicing knife.

18. The apparatus of claim 17, wherein a second slot extends through the bottom surface of each said cup, and also including:

(h) a second alignment strip having a notched portion fixedly positioned in the second slot so that the notched portion remains stationary as the cups translate along the path; and (i) a second slicing knife mounted along the path in alignment with the second slot, in a position so as to be capable of slicing an article in each cup as the cup translates past the second slicing knife.

19. The apparatus of claim 18, wherein the first slicing knife is oriented substantially parallel to the second slicing knife.

20. The apparatus of claim 14, wherein a second slot extends through the bottom surface of each said cup, and also including:

(f) a second alignment strip having a notched portion fixedly positioned in the second slot so that the notched portion remains stationary as the cups translate along the path.

21. The apparatus of claim 20, wherein the notched portion of the first strip has a first curved upper edge which protrudes above the bottom surface of each cup and defines a first set of notches, and the notched portion of the second strip has a second curved upper edge which protrudes above the bottom surface of each cup and defines a second set of notches.

22. The apparatus of claim 21, wherein each notch in the first set is aligned with a corresponding one of the notches in the second set along a line perpendicular to the path.

23. The apparatus of claim 21, wherein each cup is dimensioned to carry an elongated article having a longitudinal axis, and wherein each notch in the first and second sets is shaped so as to bump any such elongated articles in the cups translating past said each notch in a manner tending to align such elongated articles with their longitudinal axes perpendicular to the path.

24. An article alignment apparatus, including:

(a) a rotatable drum, having a substantially cylindrical outer surface;

(b) a number of chucks mounted on the outer surface of the drum, each said chuck having an outer surface defining a cup, wherein the cups are arranged along a substantially circular path, each cup has an elongated cup surface including a leading edge oriented substantially perpendicularly to the path and a trailing edge oriented substantially perpendicularly to the path, and wherein a first slot extends substantially parallel to the path through each cup surface;

(c) means positioned adjacent the drum for loading articles into the cups;

(d) means for rotating the drum so as to translate the cups along the path; and (e) a first alignment strip having a notched portion fixedly positioned in the first slot so that the notched portion remains stationary as the cups translate along the path.

25. The apparatus of claim 24, wherein the notched portion of the first strip has a first curved upper edge which protrudes above each cup surface and defines a first set of notches, wherein each cup is dimensioned to carry at least one elongated article having a longitudinal axis, and wherein each notch in the first set of notches is shaped so as to bump any such elongated article in any of the cups translating past said first set of notches in a manner tending to align such elongated article against said cup's trailing edge with the longitudinal axis of said elongated article aligned perpendicular to the path.

26. The apparatus of claim 24, wherein each cup is dimensioned to receive an olive.

27. The apparatus of claim 24, also including:

(f) a first slicing knife mounted along the path in alignment with the first slot, in a position so as to be capable of slicing an article in each cup as the cup translates past the first slicing knife.

28. The apparatus of claim 27, wherein a second slot extends substantially parallel to the path through each cup surface, and also including:

(g) a second alignment strip having a notched portion fixedly positioned in the second slot so that the notched portion remains stationary as the cups translate along the path; and (h) a second slicing knife mounted along the path in alignment with the second slot, in a position so as to be capable of slicing an article in each cup as the cup translates past the second slicing knife.

29. The apparatus of claim 24, wherein a plurality of slots extend through each cup surface, and including:

a plurality of alignment strips, each having a notched portion fixedly positioned in a different one of the slots so as to remain stationary as the cups translate along the path past said notched portion.

* * * * *